Jan. 9, 1951
M. S. SAGE
2,537,790
DETERGENT DISSOLVING DEVICE
Filed Jan. 13, 1948
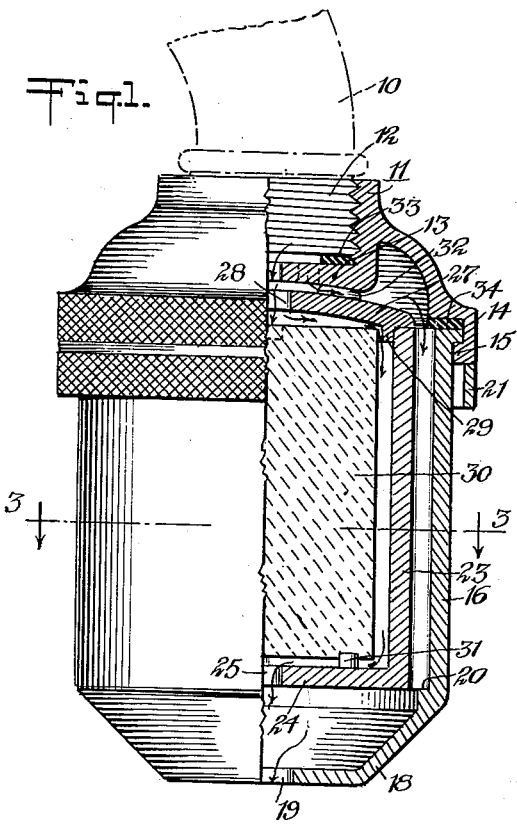
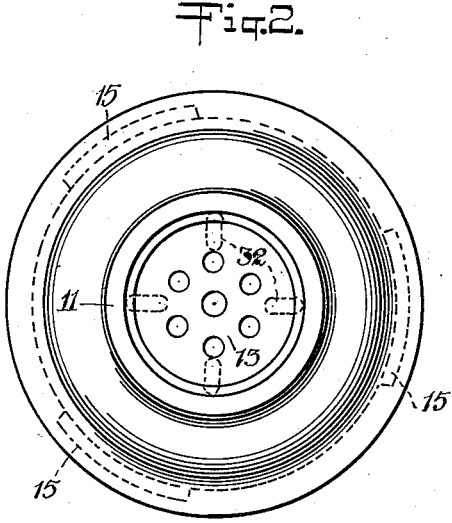
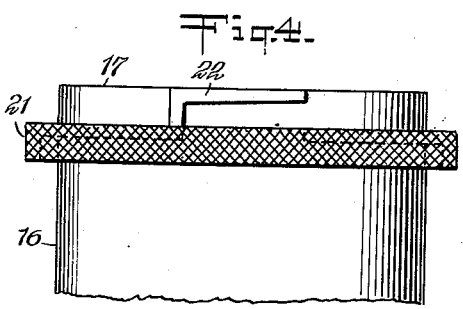
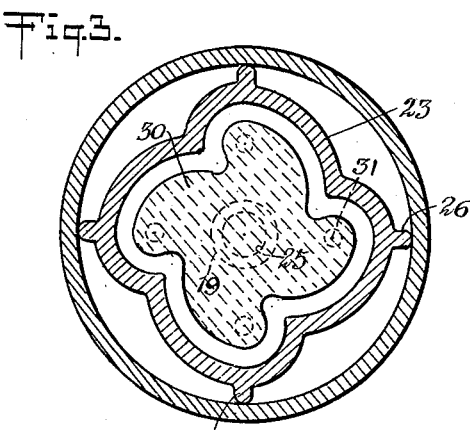
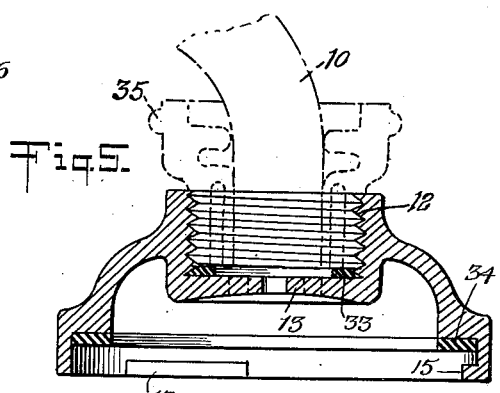
INVENTOR
Maurice S. Sage
BY
Munn, Liddy & Glaccum
ATTORNEYS Patented Jan. 9, 1951

2,537,790

UNITED STATES PATENT OFFICE 2,537,790

DETERGENT DISSOLVING DEVICE

Maurice S. Sage, Brooklyn, N. Y., assignor to Sage Laboratories, Inc., New York, N. Y.

Application January 13, 1948, Serial No. 2,069

2 Claims. (Cl. 299—83)

This invention relates to new and useful improvements in devices for washing and for dispensing washing and deterging material.

An object of the invention is to provide a simple, rugged, inexpensive, easily manipulable device which can be easily attached to any faucet to enable dishes and the like to be washed.

A further object is to provide a device which can employ detergents in cake form and can be easily and quickly assembled and disassembled for repair, inspection, and replacement of the parts.

A further object is to provide a device in which the flow of fluid through the detergent is regulated in relation to the fluid with which it mixes to form the final mixture applicable to the articles being washed.

A further object is to provide a device in which substitution of inferior substitute cakes of detergents is made difficult thus avoiding inferior imitation.

Further and more specific objects, features and advantages will more clearly appear from the detailed specification hereinafter set forth especially when taken in connection with the accompanying drawings which illustrate a present preferred form which the invention may assume and which forms part of the specification.

In brief and general terms the invention includes a cap of cup shape which can be fitted easily over the end of a faucet by friction or by screwing. A casing is insertable into the cap and connected by a quick-detachable means thereto. A receptacle is disposed within the casing and is of irregular cross sectional form and contains a cake of detergent of smaller but similar shape definitely positioned therein and is provided with means to engage the walls of the casing to position the receptacle therein. The cap is provided with a wall perforated to provide a shower effect and can be so used independently of the rest of the unit. When the fluid is turned on some runs through the receptacle and picks up some of the detergent material but the major portion passes down between the casing and the receptacle and issues through a common discharge outlet with the fluid that has passed through the receptacle. The parts are simple, rugged, economical to make, and extremely easy to assemble and disassemble.

The present preferred form which the invention may assume is illustrated in the accompanying drawings, of which Fig. 1 is an elevation, partly broken away, of the dispenser device;

Fig. 2 is a plan view of the device;

Fig. 3 is a horizontal section taken on the line 3—3 of Fig. 1;

Fig. 4 is an elevation of the upper end of the detachable casing; and

Fig. 5 is a vertical cross section of the upper cap and showing its connection with a water or liquid faucet.

The device is adapted to be attached to the spout of a faucet or similar outlet for liquid shown in dotted lines 10 in Figs. 1 and 5. The faucet may either have a screw-threaded end as shown in Fig. 1 or a smooth end as shown in Fig. 5.

In the form shown in Fig. 1 the device has a cup-shaped shallow cap portion with an interiorly threaded neck portion 11 to be screwed on to the threads 12 of the end of the spout 10. This cap has a perforated wall 13 at the inner end of the threaded neck 11. This gives a dispersion of the flow into the device and if the cap is used by itself will permit the cap to act as a shower device. The other end of the cap is a circular wall 14 with several inwardly extending separate flanges 15 at its lower edge.

Insertable within the lower open face of the cap is a casing 16 of cylindrical shape with an open upper end 17 and a tapered lower end 18 with a discharge opening 19 therein. At the point within the casing where the cylindrical walls meet the tapered lower end 18 there is formed an inwardly extending shoulder 20. At its upper portion, the casing 16 is provided with an encircling collar 21 which when the casing is in the position shown in Fig. 1, abuts the lower face of the flange 14 of the cap. The upper outer face of the casing is provided with one or more bayonet lugs 22 which are adapted to interlock with the spaced flanges 15 to lock the cap and the casing in this usual quick-detachable manner so that a turn of the wrist may detach the thus connected parts. To connect them the upper end of the casing is pushed into position and then twisted to lock the bayonet connection.

Within the casing 16 there is adapted to be disposed a receptacle 23 for the soap or detergent substance which is employed for washing the dishes or for similar purposes. This receptacle as shown in Fig. 3 is of a symmetrical but irregular section and hollow with an open upper end and a bottom wall 24 having a single fluid passage 25 therein. The outer face of the receptacle 23 is provided with several vertical ribs 26 adapted to lie in abutment with the inner wall of the casing 16 and at their bottoms to rest upon the shoulder 20 therein so that the receptacle is disposed definitely within the casing.

The top of the receptacle 23 is covered by a removable cover member 27 with a central fluid inlet aperture 28 and a dependent flange 29 fitting snugly within the upper end of the receptacle 23. Disposed within the receptacle 23 is a cake 30 of soap or detergent material which is a height substantially that of the receptacle. The cross sectional area and configuration of the cake 30 is the same as that of the receptacle 23 but slightly smaller, as shown in Fig. 3. The bottom of the receptacle 23 is provided with studs or pins 31 which project slightly into the bottom of the cake 30 so as to more firmly hold it in position.

Ribs 32 are disposed on the top of the cover member 27 to bear against the under surface of the perforated wall 13 so as to form means to further definitely confine the receptacle within the casing 16. Washers 33 and 34 are respectively disposed between the end of the threaded spout 10 and the wall 13 and between the inner surface of the cap and the upper end of the casing 16 as shown in Fig. 1. When the end of the spout is not threaded there is provided an auxiliary rubber sleeve 35 shown in dotted lines in Fig. 5 which is slipped over the end of the spout 10 and its outer surface is provided with threads to engage the threads on the inner surface of the neck 11 of the cap as shown.

In the operation of the device it is clear that the neck is slipped over or threaded on to the end of a faucet and if the faucet has no threads then the auxiliary sleeve 35 is employed. The cake of detergent is positioned within the receptacle and being of the same but smaller irregular shape it is difficult to use this cake with other receptacles and vice versa. The pins 31 hold the cake firmly in position with a slight passage around the cake within the receptacle to permit of fluid passage. The receptacle rests on the shoulder 20 of the casing and above the tapered lowered end thereof and has an outlet opening 25 from which fluid emerges mixed with detergent to flow out of the device with fluid which passes around the receptacle and which has come directly from the shower-like perforated plate or wall 13 in the cap. The receptacle is held in position in the casing by the ribs 26. The bayonet and slot connection between the cap and casing make for an easy and quick attachment and removal of the parts when desired.

While the invention has been described in detail and with respect to present preferred forms which it may assume, it is not to be limited to such details and forms since many changes and modifications may be made in the invention without departing from the spirit and scope of the invention in its broadest aspects. Hence it is desired to cover any and all forms and modifications of the invention which may come within the language or scope of any one or more of the appended claims.

I claim:
1. In a device of the class described, a cap to fit over the end of a faucet and having a threaded neck and a flanged cup-shaped body and a perforated wall in the cap at the inner end of the neck, a casing having an apertured bottom and an open upper end to be inserted into the cap, quick-detachable means to connect the cap and the casing, a receptacle of irregular cross sectional form disposed within the casing, a shoulder on the casing on which the receptacle rests, ribs on the outer wall of the receptacle within the casing, the receptacle having inlet and discharge openings therein, said receptacle having a cake of detergent therein and of slightly smaller but similar cross sectional form, projections on the bottom of the receptacle projecting slightly into the cake to position it within the receptacle, and a removable cover on the receptacle having a central opening disposed beneath the perforated inner wall of the cap.

2. In a device of the class described, a cap to fit over the end of a faucet and having a threaded neck and a flanged cup-shaped body and a perforated wall in the cap at the inner end of the neck, a casing having an apertured bottom and an open upper end to be inserted into the cap, a receptacle disposed within the case, a shoulder on the casing on which the receptacle rests, ribs on the outer wall of the receptacle to space the same from and within the casing, the receptacle having inlet and discharge openings therein, said receptacle adapted to receive a cake of detergent material, projections on the bottom of the receptacle projecting slightly into the cake to position it within the receptacle, and a removable cover on the receptacle having a central opening disposed beneath the perforated inner wall of the cap.

MAURICE S. SAGE.

REFERENCES CITED

The following references are of record in the file of this patent:

UNITED STATES PATENTS

| Number | Name | Date |
| --- | --- | --- |
| 564,615 | Handly | July 28, 1896 |
| 582,051 | Fuerbringer | May 4, 1897 |
| 623,851 | Van Riper et al. | Apr. 25, 1899 |
| 947,726 | Zimmer | Jan. 25, 1910 |
| 1,059,773 | Sgambati | Apr. 22, 1913 |
| 1,260,777 | Kirkegaard | Mar. 26, 1918 |
| 1,486,100 | McKenney et al. | Mar. 4, 1924 |
| 1,690,591 | Nelthorpe | Nov. 6, 1928 |
| 2,135,969 | Donaldson | Nov. 8, 1938 |
| 2,304,867 | Wenker | Dec. 15, 1942 |
| 2,348,334 | Ellinger | May 9, 1944 |
| 2,359,797 | Schnider | Oct. 10, 1944 |